(12) United States Patent
Paukner et al.

(10) Patent No.: US 10,995,645 B2
(45) Date of Patent: May 4, 2021

(54) EXHAUST AFTERTREATMENT SYSTEM AND METHOD FOR REGENERATING A PARTICULATE FILTER

(71) Applicant: VOLKSWAGEN AKTIENGESELLSCHAFT, Wolfsburg (DE)

(72) Inventors: Stefan Paukner, Wolfsburg (DE); Falk-Christian Baron Von Ceumern-Lindenstjerna, Braunschweig (DE); Michael Manz, Langenhagen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/439,140

(22) Filed: Jun. 12, 2019

(65) Prior Publication Data

US 2019/0376432 A1    Dec. 12, 2019

(30) Foreign Application Priority Data

Jun. 12, 2018  (DE) ...................... 10 2018 114 025.8

(51) Int. Cl.
*F01N 9/00* (2006.01)
*B01D 46/00* (2006.01)
(Continued)

(52) U.S. Cl.
CPC ......... *F01N 9/002* (2013.01); *B01D 46/0027* (2013.01); *B01D 46/0063* (2013.01);
(Continued)

(58) Field of Classification Search
CPC ............ B01D 46/0027; B01D 46/0063; B01D 53/9454; B01D 53/9477; B01D 2255/904;
(Continued)

(56) References Cited

U.S. PATENT DOCUMENTS

| 4,251,990 A | * | 2/1981 | Norimatsu | .......... | F02D 41/1441 |
|---|---|---|---|---|---|
| | | | | | 60/276 |
| 2004/0123590 A1 | * | 7/2004 | Tabata | .................. | F02D 41/029 |
| | | | | | 60/295 |

(Continued)

FOREIGN PATENT DOCUMENTS

| CN | 107250496 A | 10/2017 |
|---|---|---|
| DE | 10 2010 046 747 A1 | 3/2011 |

(Continued)

OTHER PUBLICATIONS

Extended search report for European Patent Application No. 19179296. 9, dated Sep. 2, 2019.

(Continued)

*Primary Examiner* — Brandon D Lee
(74) *Attorney, Agent, or Firm* — Pearl Cohen Zedek Latzer Baratz LLP

(57) ABSTRACT

An exhaust aftertreatment system for an internal combustion engine has an exhaust system having at least one three-way catalyst near the engine, wherein a particulate filter is arranged downstream from the three-way catalyst, preferably in an underbody installation in a motor vehicle. A heated catalyst, which has at least one heating stage that can be heated by means of an electric heating element, is provided upstream from the at least one three-way catalyst and downstream from the particulate filter. The at least one electrically heatable heating stage is supplied with electric power directly from a generator that is operatively connected to the internal combustion engine, so that heating of the heated catalyst takes place essentially independently of the charge status of the vehicle battery.

10 Claims, 3 Drawing Sheets

(51) Int. Cl.
*B01D 53/94* (2006.01)
*F01N 3/023* (2006.01)
*F01N 3/035* (2006.01)
*F01N 3/10* (2006.01)
*F01N 3/20* (2006.01)
*F01N 3/30* (2006.01)
*F01N 11/00* (2006.01)

(52) U.S. Cl.
CPC ..... *B01D 53/9454* (2013.01); *B01D 53/9477* (2013.01); *F01N 3/023* (2013.01); *F01N 3/035* (2013.01); *F01N 3/101* (2013.01); *F01N 3/2013* (2013.01); *F01N 3/30* (2013.01); *F01N 11/007* (2013.01); *B01D 2255/904* (2013.01); *B01D 2279/30* (2013.01); *F01N 2250/02* (2013.01); *F01N 2430/06* (2013.01); *F01N 2550/04* (2013.01); *F01N 2560/025* (2013.01); *F01N 2900/1402* (2013.01); *F01N 2900/1602* (2013.01); *F01N 2900/1606* (2013.01)

(58) Field of Classification Search
CPC . B01D 2279/30; F01N 11/007; F01N 13/009; F01N 13/0093; F01N 3/021; F01N 3/023; F01N 3/027; F01N 3/035; F01N 3/05; F01N 3/101; F01N 3/2013; F01N 3/30; F01N 9/002; F01N 2240/16; F01N 2250/02; F01N 2430/06; F01N 2550/04; F01N 2560/025; F01N 2900/1402; F01N 2900/1602; F01N 2900/1606
See application file for complete search history.

(56) References Cited

U.S. PATENT DOCUMENTS

| | | | | |
|---|---|---|---|---|
| 2004/0226287 | A1* | 11/2004 | Edgar | F01N 3/023 60/295 |
| 2006/0177358 | A1* | 8/2006 | Lee | F01N 3/2013 422/174 |
| 2007/0044453 | A1* | 3/2007 | Strauser | F01N 3/035 60/286 |
| 2009/0173063 | A1* | 7/2009 | Boorse | F01N 13/0097 60/299 |
| 2011/0023469 | A1* | 2/2011 | Berke | F01N 3/2013 60/295 |
| 2011/0072788 | A1* | 3/2011 | Ruona | F01N 9/00 60/276 |
| 2014/0157982 | A1 | 6/2014 | Ardanese et al. | |
| 2017/0204763 | A1* | 7/2017 | Nishioka | F01N 3/208 |
| 2017/0226909 | A1 | 8/2017 | Hirth et al. | |
| 2018/0038251 | A1 | 2/2018 | Uchiyama et al. | |
| 2018/0094556 | A1 | 4/2018 | Kurtz et al. | |

FOREIGN PATENT DOCUMENTS

| | | |
|---|---|---|
| DE | 10 2013 113 448 A1 | 6/2014 |
| DE | 10 2013 018 208 A1 | 4/2015 |
| DE | 10 2014 115 923 A1 | 5/2016 |
| DE | 10 2015 212 514 A1 | 1/2017 |
| DE | 10 2017 122 892 A1 | 4/2018 |
| DE | 10 2016 122 304 A | 5/2018 |
| EP | 2 282 027 A1 | 2/2011 |

OTHER PUBLICATIONS

Search report for German Patent Application No. 10 2018 114 025.8, dated Apr. 26, 2019.
Office Action for Chinese Patent Application No. 2019105009490, dated Jan. 7, 2021.

* cited by examiner

EXHAUST AFTERTREATMENT SYSTEM AND METHOD FOR REGENERATING A PARTICULATE FILTER

CROSS REFERENCE TO RELATED APPLICATION

This application claims priority from German Patent Application No. 10 2018 114 025.8, filed Jun. 12, 2018, entitled "EXHAUST AFTERTREATMENT SYSTEM AND METHOD FOR REGENERATING A PARTICULATE FILTER", which is incorporated herein by reference in its entirety.

FIELD OF THE INVENTION

The invention relates to an exhaust aftertreatment system for an internal combustion engine as well as a method for regenerating a particulate filter in the exhaust system of a gasoline engine.

BACKGROUND OF THE INVENTION

As regulations governing exhaust emissions have steadily become more stringent, the resulting high demands on automobile manufacturers must be met through appropriate exhaust aftertreatment and corresponding measures to reduce crude engine emissions, and with the introduction of the EU6 stage of legislative requirements, the stipulated limits for particle counts for gasoline engines will in many cases necessitate the use of a gasoline particulate filter. Such carbon black particles are formed in particular after a cold start of an internal combustion engine due to incomplete combustion in combination with a sub-stoichiometric combustion air ratio after a cold start as well as the cold cylinder walls and the heterogeneous mixture distribution in the combustion chambers of the internal combustion engine. In contrast with the load of a diesel particulate filter, the carbon black load of a gasoline particulate filter depends on the temperature of the combustion chamber to a significant extent and declines with an increase in the temperature of the combustion chamber. The cold start phase is thus definitive for maintaining the particle limit values stipulated by law with regard to the particle mass as well as with regard to the particle count. When outside temperatures are cold, in particular when ambient temperatures are below 0° C., high particle emissions are created with a gasoline engine in particular because of the evaporation of fuel, the initial enrichment and the low homogenization of the mixture. Furthermore, a cold start with a sub-stoichiometric, rich combustion air ratio leads to higher emissions of carbon monoxide (CO) and unburned hydrocarbons (HC) because it is not yet possible to convert them to carbon dioxide and water vapor due to the cold catalyst. In driving operation of motor vehicles having a gasoline particulate filter, the gasoline particulate filter is then loaded further with carbon black. To prevent the exhaust gas back-pressure from rising too much, the gasoline particulate filter must be regenerated periodically or continuously. The increase in exhaust gas back-pressure can result in increased fuel consumption by the internal combustion engine, a loss of power and negative effects on smooth running, and even misfiring. To implement thermal oxidation of the carbon black retained in the gasoline particulate filter with oxygen, a sufficiently high temperature level is required in combination with oxygen that is present at the same time in the exhaust system of the gasoline engine. Since modern gasoline engines are normally operated with a stoichiometric combustion air ratio ($\lambda=1$), i.e., without excess oxygen, additional measures are therefore required. For example, an increase in temperature by adjusting the firing angle, a temporary adjustment to a lean mixture of the gasoline engine, injection of secondary air into the exhaust system or a combination of these measures may be considered. So far, a firing angle adjustment in the late direction or a combination with a lean adjustment of the gasoline engine is preferably used because this method does not require any additional components and can supply a sufficient amount of oxygen in most operating points of the gasoline engine.

Because of the good efficiency of the gasoline engine, regeneration of a particulate filter is impossible in a underbody installation in certain operating situations Therefore, special driving cycles are required to regenerate a particulate filter in an underbody installation.

DE 10 2010 046 747 A1 discloses an exhaust aftertreatment system for a gasoline engine and a method for exhaust aftertreatment. A particulate filter is situated downstream from a three-way catalyst, and a secondary air system can be provided for regeneration of the carbon black particles retained in the particulate filter, such that the secondary air system injects fresh air into the exhaust system downstream from the three-way catalyst and upstream from the particulate filter. Secondary air is used in these situations to exothermically convert the unburned constituents of the exhaust, in particular unburned hydrocarbons, and to heat the exhaust stream as well as to supply the oxygen necessary for regeneration of the particulate filter.

However, one disadvantage of these approaches is that a high temperature level must be reached in the exhaust system for this exothermic reaction in order to exothermically convert the unburned exhaust constituents.

SUMMARY OF THE INVENTION

The object of the present invention now is to permit regeneration of the particulate filter in all operating situations of a motor vehicle.

According to the invention, this object is achieved by an exhaust aftertreatment system for an internal combustion engine, in particular a gasoline engine with spark ignition via spark plugs, having an exhaust system comprising at least one three-way catalyst near the motor and a particulate filter or four-way catalyst arranged downstream from the at least one three-way catalyst near the engine. The internal combustion engine is preferably an internal combustion engine for driving a motor vehicle. According to the invention it is provided that a heated catalyst having at least one electric heating element is provided downstream from the at least one three-way catalyst and upstream from the particulate filter or four-way catalyst, such that the electric heating element is connected to a generator of the internal combustion engine so that heating of the at least one electric heating element is possible directly through the electric current generated by the generator. In this context a position near the engine is understood to be a position of the three-way catalyst in the exhaust system with an exhaust running length of less than 80 cm from an outlet of the internal combustion engine, preferably an exhaust running length of less than 50 cm. A direct power supply from the generator to the electric heating element is understood to mean that the electricity required for heating is not stored temporarily in a battery and does not depend on operation of an electric consumer. Therefore, the heating of the electric heating element can take place independently of the charge status of the battery or the operating condition of the consumer. Conversion of pollutants then takes place through the three-way catalyst(s) near the engine. The heated catalyst and the particulate filter may be designed to be free of a catalytically effective coating so that there is no influence on the conversion of the gaseous exhaust components and there can be on-board diagnostics of the particulate filter via differential pressure sensors. In doing so, the heating power for heating the particulate filter is preferably supplied by the generator operation of a generator driven by means of a drive element of the internal combustion engine. Due to the additional load, there is a load point shift of the internal combustion engine, which additionally leads to an increase in the exhaust heat current. This additionally increases the heat input into the particulate filter, so that it is heated more rapidly to a regeneration temperature required for oxidation of the retained carbon black. In addition the charge status of the battery is not affected negatively by the heating process so that regeneration of the particulate filter is independent of the charge status of the battery.

Advantageous improvements in and refinements of the exhaust aftertreatment device defined in the independent claim are possible through the features defined in the dependent claims.

In a preferred embodiment of the invention, it is provided that the heated catalyst includes a plurality of electric heating elements. By using a plurality of heating stages, the possible electric heating power can be multiplied. Therefore, a high heating output can be implemented and regeneration of the particulate filter is also possible at a low load on the internal combustion engine and at low outside temperatures.

It is especially preferable here if the heated catalyst comprises a plurality of heating stages arranged sequentially, such that a support catalyst is connected downstream from each heating stage. A local overheating of the heated catalyst can be prevented by at least two heating stages through which the flow passes sequentially so that the risk of thermal damage to the heated catalyst is reduced while nevertheless a high heating output can be introduced into the exhaust stream.

In an advantageous embodiment of the invention it is provided that the electric heating elements are designed as electric heating disks. Electric heating disks can be attached easily and inexpensively to the housing of the heated catalyst and/or to the support catalyst. The heating disks have only a small extent in the direction of flow of the exhaust gas through the heated catalyst so that a plurality of heating stages that follow one another sequentially can be implemented easily.

In a preferred specific embodiment of the invention, it is provided that the particulate filter is designed to be free of a catalytic coating. Due to the embodiment of the particulate filter so that it is free of a catalytic coating, the exhaust gas back-pressure can be reduced so that the intervals between two regeneration cycles can be lengthened. Furthermore, due to the reduced exhaust gas back-pressure, consumption of fuel by the internal combustion engine is reduced and/or the available power is increased. Furthermore, on-board diagnostics can be performed via the pressure sensors for the differential pressure measurement of the particulate filter such that for a diagnosis it is necessary only to monitor for complete failure of the particulate filter, and it is not necessary to have a comparable sensor system for monitoring the functionality of a catalytic coating.

It is especially preferable if the heated catalyst is also designed to be free of a catalytically active coating. If the heated catalyst is designed to be free of a catalytically active coating, then on-board diagnostics can be limited to monitoring the three-way catalyst(s) near the engine, so that the monitoring can be embodied in a simplified and inexpensive manner.

In a preferred embodiment of the exhaust aftertreatment system, it is provided that a second three-way catalyst is arranged in the exhaust system downstream from the first three-way catalyst and upstream from the heated catalyst, wherein a first lambda probe is arranged in the exhaust system upstream from the first three-way catalyst and a second lambda probe is arranged downstream from the first three-way catalyst and upstream from the second three-way catalyst. A suitably high catalyst volume can be made available by means of two catalysts near the engine so that a high conversion efficiency can be achieved even with a large exhaust gas volume due to a high load operation of the internal combustion engine and high rotational speeds.

In an advantageous specific embodiment of the invention, it is provided as an additional improvement that an inlet site for introduction of secondary air into the exhaust system is provided downstream from the second three-way catalyst and upstream from the heated catalyst. The introduction point for the secondary air should be arranged as far as possible upstream from the heated catalyst in order to supply the longest possible mixing zone for the exhaust gas and fresh air and thus achieve a good mixing of the exhaust gas-fresh air mixture until its entrance into the particulate filter. The secondary air can be supplied by means of a secondary air pump, a compressor or a compressor tap of the compressor of an exhaust gas turbocharger and should ideally take place in such a way that the exhaust gas air ratio for the mixed exhaust gas is adjusted to $1.05 < \lambda_M < 1.2$ before entrance to the particulate filter.

Alternatively, it is advantageously provided that exactly one three-way catalyst is arranged near the engine, and the particulate filter is designed as the four-way catalyst with a three-way catalytically active coating. This has the advantage that a second three-way catalyst (near the engine) can be omitted and on the whole fewer components are needed, which lowers the cost for the exhaust aftertreatment system and the required installation space. However, this arrangement may result in a slight increase in emissions in regeneration of the particulate filter.

As an alternative, it is also provided that the heated catalyst has a three-way catalytically active coating. Due to a catalytic coating of the heated catalyst, the heating of the heated catalyst can be accelerated in particular in combination with a secondary air system. Furthermore, an additional catalytic volume is supplied, which can improve the efficiency of the exhaust aftertreatment at high space velocities and large exhaust volumes in particular. However, this requires additional sensors to monitor the on-board diagnostics of the catalyst performance of the heated catalyst.

According to the invention, a method for exhaust aftertreatment of the gas of an internal combustion engine having an exhaust aftertreatment system according to the invention is proposed, comprising the following steps:

ascertaining the load status of a particulate filter ascertaining the component temperature of the particulate filter heating the particulate filter to a regeneration temperature necessary for oxidation of the carbon black retained in the particulate filter when regeneration of the particulate filter is required and when the component temperature of the particulate filter is below the regeneration temperature, wherein the electric heating element of the heated catalyst is supplied with electric current directly from the generator.

The method according to the invention has the advantage that the temperature required for regeneration of the particulate filter can be achieved in all operating situations of a motor vehicle even with a particulate filter in a position remote from the engine, in particular with an underbody installation in the motor vehicle. In doing so, there is no additional load on the battery in these operating situations, in which there is usually only a comparatively low output of the generator and thus a low charging current for the battery, so that regeneration of the particulate filter can take place independently of the charge status of the battery.

In an advantageous improvement on the method, it is provided that an additional load is generated by the generator on detection of the need for regeneration of the particulate filter, so that an operating point of the internal combustion engine is shifted in the direction of a higher engine torque at the same rotational speed, and a higher exhaust temperature is achieved at the same rotational speed. The required output is increased due to the increase in engine load due to the higher load demand for the generator. Therefore, the temperature of the exhaust increases at a constant rotational speed of the internal combustion engine, so that heating of the particulate filter takes place due to the hotter exhaust gas in addition to the electrical heating of the exhaust stream by the heated catalyst. Therefore, the particulate filter can be heated to its regeneration temperature more quickly under otherwise the same operating conditions.

In a further improvement of the method, it is provided that the internal combustion engine is operated at a stoichiometric or sub-stoichiometric combustion air ratio during the regeneration of the particulate filter, wherein secondary air is injected into the exhaust system downstream from the last three-way catalyst such that a super-stoichiometric exhaust gas with an exhaust gas air ratio of $1.05<\lambda<1.2$ is established at the entrance to the particulate filter. Therefore, emissions of the internal combustion engine can be converted efficiently by the at least one three-way catalyst, so that regeneration of the particulate filter does not result in an increase in emissions and in particular does not result in an increase in NOx emissions due to super-stoichiometric operation of the internal combustion engine to supply the oxygen required for regeneration of the particulate filter.

The various specific embodiments of the invention referenced in this patent application can be combined advantageously with one another unless otherwise indicated in the individual case.

BRIEF DESCRIPTION OF THE DRAWINGS

The invention will now be explained in greater detail below on the basis of exemplary embodiments as illustrated in the respective drawings, in which.

DETAILED DESCRIPTION OF THE INVENTION

Figure 1:
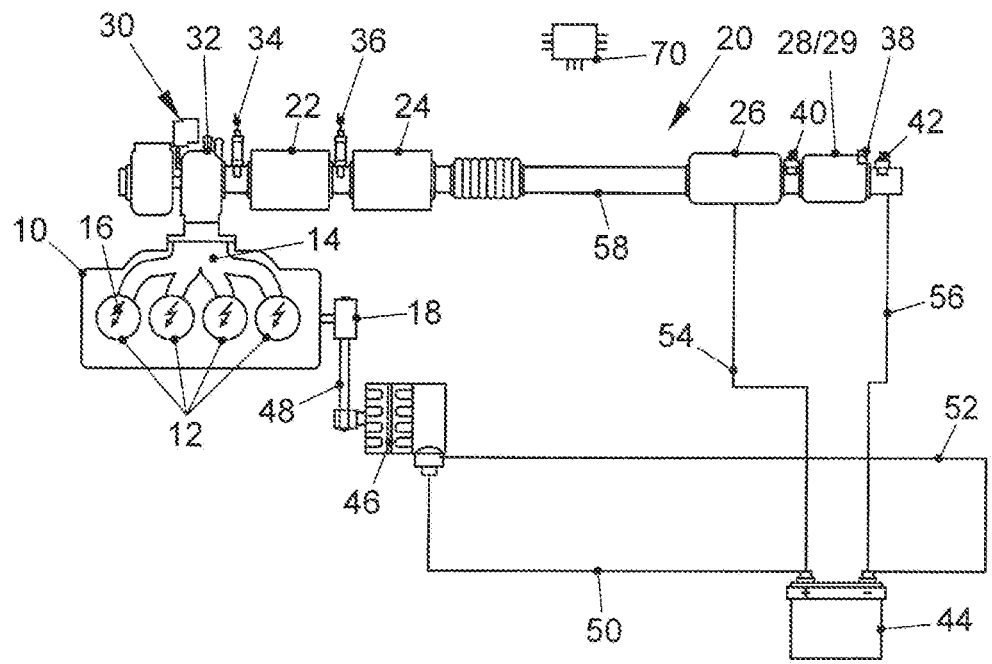
FIG. 1 shows a first embodiment of an internal combustion engine having an exhaust aftertreatment system according to the invention.

FIG. 1 shows an internal combustion engine 10 with spark ignition by means of sparkplugs 16. The internal combustion engine has a plurality of combustion chambers 12. The internal combustion engine 10 is connected to an exhaust system 20 at its outlet 14. Furthermore, an output shaft 18 which drives a generator 46 via a drive element 48 is provided on the internal combustion engine. The drive element may be embodied in particular as a belts or a chain. The exhaust system 20 comprises an exhaust channel 58 in which (listed in the direction of flow of the exhaust through the exhaust channel 58) the exhaust channel 58 has a turbine 32 of an exhaust turbocharger 30; downstream from the turbine 32, it has a first three-way catalyst 22 near the motor; and downstream from the first three-way catalyst 22, it has another three-way catalyst 24. Downstream from the second three-way catalyst 24, there is a heated catalyst 26 by means of which an exhaust stream of the internal combustion engine 10 can be heated before entering into a particulate filter 28 arranged downstream from the heated catalyst 26. The particulate filter 28 is preferably designed to be free of a catalytic coating. Alternatively, the particulate filter 28 may also be embodied as a so-called four-way catalyst, i.e., as a particulate filter 28 with a three-way catalytically active coating. Downstream from the outlet 14 and upstream from the first three-way catalyst 22, preferably downstream from the turbine 32 of the exhaust turbocharger 30 and upstream from the first three-way catalyst 22, a first lambda probe 34, preferably a broadband lambda probe, is arranged in the exhaust channel 58. Downstream from the first three-way catalyst 22 and upstream from the second three-way catalyst 24, a second lambda probe, in particular a lambda probe trim 36 is arranged in the exhaust channel 58. Downstream from the heated catalyst 26 and upstream from the particulate filter 28, a first pressure sensor 40 is provided in the exhaust channel 58. A second pressure sensor 42 is provided downstream from the particulate filter 28, so that a differential pressure measurement can be carried out across the particulate filter 28. Furthermore, at least one temperature sensor 38 may be provided in the exhaust system 58 in order to determine an exhaust temperature and/or at least one component temperature of an exhaust aftertreatment component 22, 24, 26, 28, in particular the temperature of the particulate filter 28 or the temperature of the four-way catalyst 29.

Figure 3:
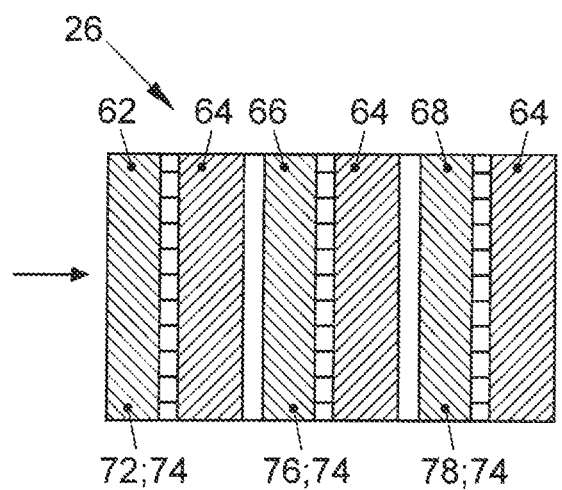
FIG. 3 shows a preferred embodiment of a heated catalyst for an exhaust aftertreatment system according to the invention.

FIG. 3 shows an electric heated catalyst 26 of an exhaust aftertreatment system according to the invention in a schematic sectional diagram. In this embodiment, the heated catalyst 26 has three heating stages 62, 66, 68, wherein each heating stage 62, 66, 68 is connected directly to a support catalyst 64 for stability reasons. Due to the use of a plurality of heating stages 62, 66, 68, the electric heating power can be multiplied, and thus the temperature that can be reached in the particulate filter can be increased. The heating stages 62, 66, 68 each have an electric heating element 72, 76, 78, preferably in the form of an electric heating disk 74. Furthermore, a control unit 70 is provided for controlling the internal combustion engine 10 and the generator 46, which is connected to the lambda probes 34, 36 and to the sensors 38, 40, 42 of the exhaust system 20 via appropriate signal lines.

The generator 46 is connected by a first electric line 50 to the positive pole of a battery 44. The generator 46 is connected to the negative pole of the battery 44 by a second electric line 52. The positive pole is connected to at least one electric heating stage 62, 66, 68 of the heated catalyst 26 by a third electric line 54. The exhaust channel 58 is connected to the negative pole of the battery 44 by a fourth electric line 56 (ground line). Therefore, there is a direction connection between the generator 46 and the electric heating elements 72, 74, 76, 78 of the heated catalyst 26 via the electric lines 50, 54 and 52, 56. The electric power required for heating the heating stages 62, 66, 68 is taken directly from the generator 46, which preferably supplies a 48-volt vehicle electric system with electric power during the heating phase and the regeneration of the particulate filter 28.

Figure 2:
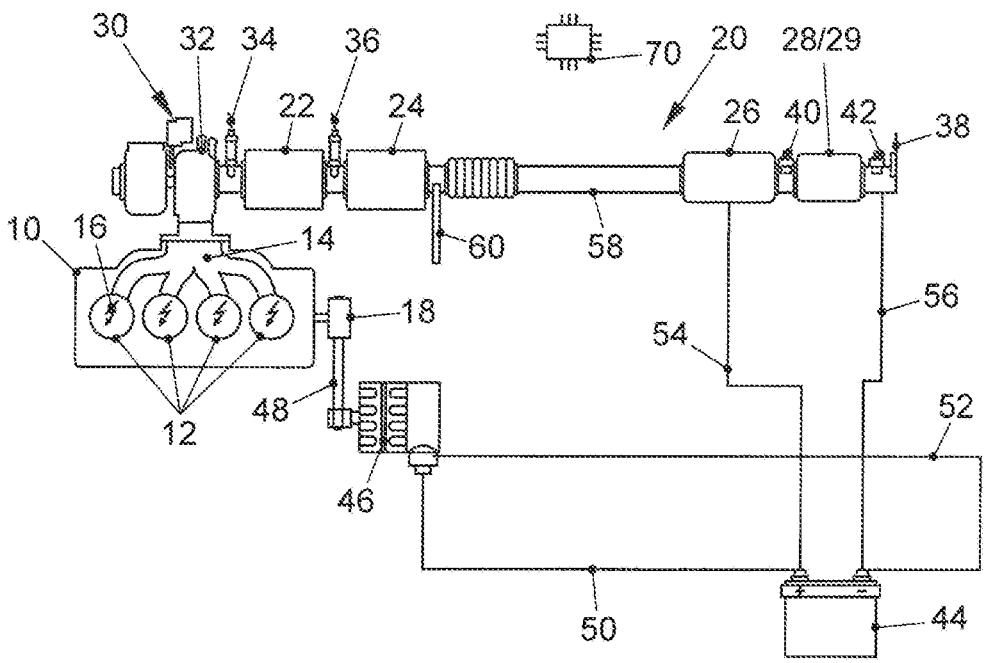
FIG. 2 shows an alternative embodiment of an internal combustion engine having a generator and an exhaust aftertreatment system in which a secondary air system is additionally provided for injecting fresh air into the exhaust channel of the exhaust system.

FIG. 2 shows another embodiment of an internal combustion engine 10 having an exhaust aftertreatment system according to the invention. In this embodiment, a secondary air system with which secondary air can be injected downstream from the second three-way catalyst 24 and upstream from the heated catalyst 26 into the exhaust channel 58 of the exhaust system 20 is additionally provided with essentially the same design as that described for FIG. 1. The inlet point 60 for the secondary air is as far upstream from the heated catalyst 26 and thus as far upstream from the particulate filter 28 or the four-way catalyst 29 as possible in order to permit the best possible mixing of the secondary air supplied via the inlet point 60 and the exhaust up to the point of entrance into the particulate filter 28 or into the four-way catalyst.

The gaseous pollutants are converted exclusively via the two three-way catalysts 22, 24 near the engine. The particulate filter 28 and the heated catalyst 26 are preferably embodied without a coating. This has the advantage that the particulate filter 28 can be monitored with respect to the on-board diagnostics by means of only the differential pressure sensors 40, 42 to prevent a total failure. One additional lambda probe for diagnosis or another three-way catalyst downstream from the particulate filter 28 may thus be omitted.

During engine operation of the internal combustion engine 10, the exhaust of the internal combustion engine 10 is cleaned by the three-way catalysts 22, 24 and the particulate filter 28. If the particulate filter 28 has reached a load level that can be determined by means of the differential pressure sensors 40, 42 or by means of a load model, regeneration of the particulate filter 28 is initiated. To achieve the temperature required for regeneration even in a particulate filter 28 in an underbody installation of a motor vehicle, the heating stages 62, 66, 68 of the heated catalyst 26 are energized electrically and heated accordingly.

Figure 4:
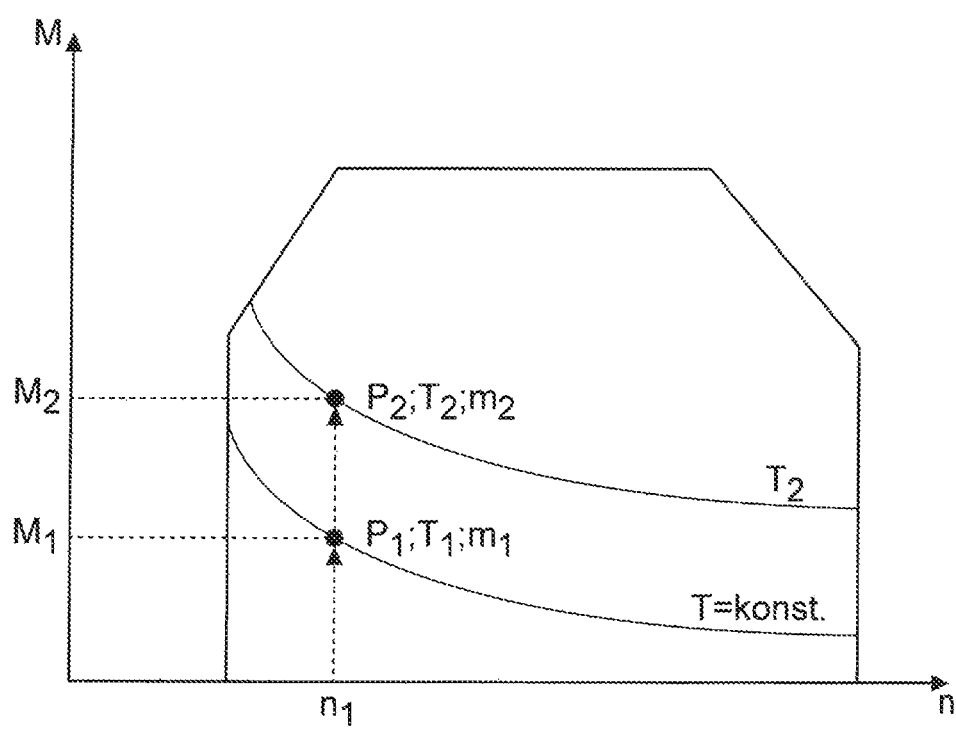
FIG. 4 shows a diagram for visualization of a load point shift because of an increased load due to the generator in a method according to the invention for regeneration of a particulate filter.

At the same time there is a load point shift in the internal combustion engine 10 due to the added load of the generator 46 at the same rotational speed resulting in a higher torque and thus a greater power which additionally results in an increase in the exhaust temperature. Such a shift in load point during the heating of the heated catalyst 26 and/or regeneration of the particulate filter 28 is illustrated in FIG. 4.

Different load points and isotherms are shown in the engine characteristics map of the internal combustion engine 10 as a function of the rotational speed n and the torque M. At the output level, the internal combustion engine 10 is operated at a rotational speed $n_1$, torque $M_1$, exhaust mass flow mi and power $P_1$. By turning on the generator 46 and/or increasing the load for the generator 46, there is a shift toward a higher power $P_2$ with a greater torque $M_2$ at a constant rotational speed $n_2=n_1$ so that the exhaust temperature and the exhaust mass flow $M_2$ also increase. The additional power level thereby achieved is introduced into the heated catalyst 26 via the generator 46, thereby resulting in a further temperature increase in the exhaust before entering the particulate filter 28. After conclusion of regeneration of the particulate filter, the generator power is reduced again so that the internal combustion engine 10 is operated again at a lower power $P_1$ and a lower exhaust temperature.

The oxygen required for regeneration of the particulate filter 28 can thus be supplied by a coasting phase of the internal combustion engine, for example. Alternatively, oxygen can also be supplied by means of a lean setting of the internal combustion engine 10. If a secondary air system is present, as in the embodiment according to FIG. 2, then the oxygen required to oxidize the carbon black is supplied by a secondary air injection into the exhaust channel 58 downstream from the second three-way catalyst 24. The required secondary air can be supplied via a secondary air pump, a compressor or by tapping fresh air from the intake system downstream from the compressor of the exhaust turbocharger 30. The mixing ratio of exhaust gas and secondary air is ideally adjusted, so that a mixed lambda of $1.05<\lambda_M<1.2$ is established at the inlet to the particulate filter 28. Then enough oxygen is being supplied for regeneration and the risk of an uncontrolled carbon burn-off in the particulate filter 28 is avoided.

Figure 5:
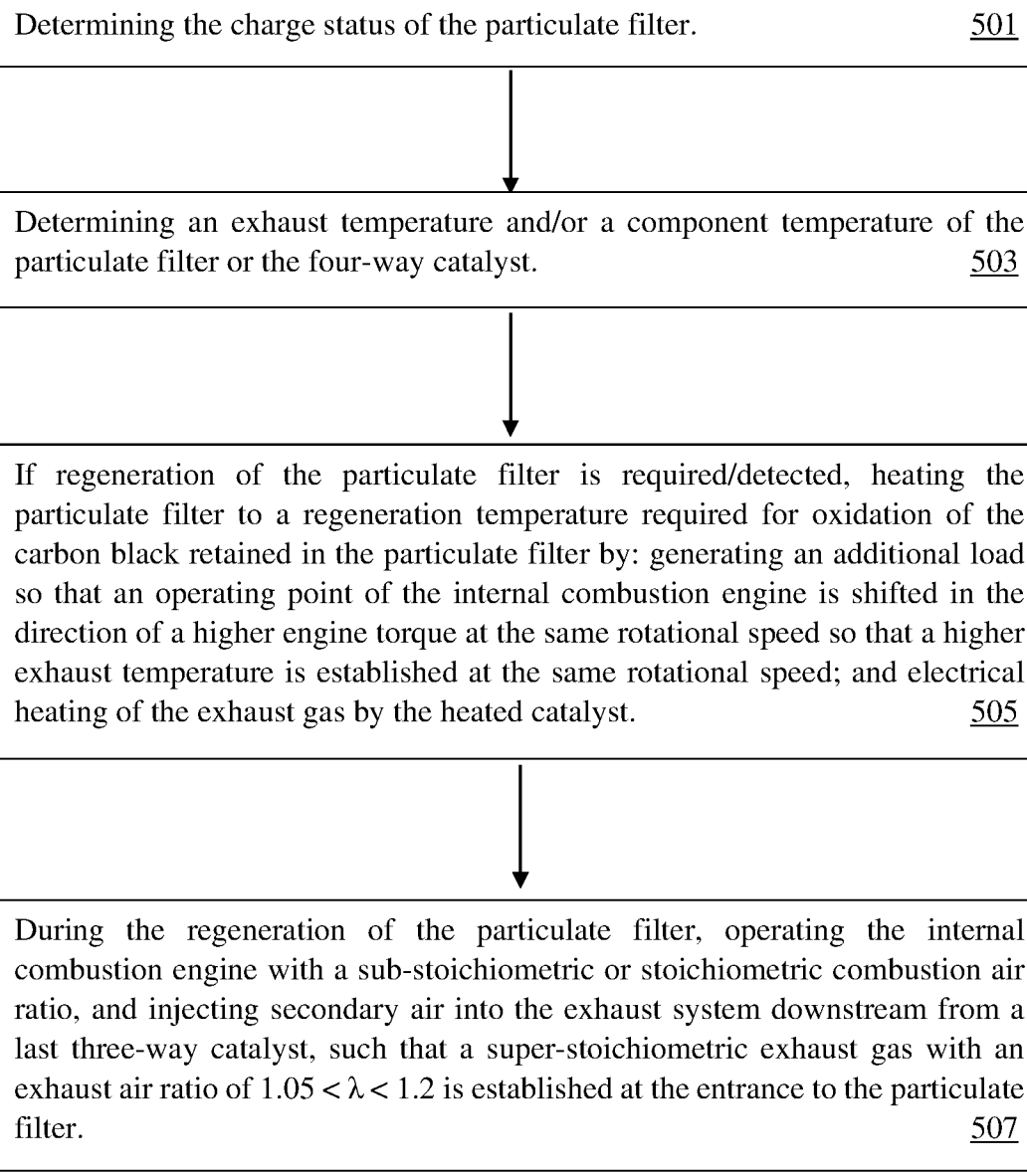
FIG. 5 shows a flowchart for a method for regeneration of a particulate filter according to the invention.

FIG. 5 shows a flowchart for a method for regeneration of the particulate filter (e.g., the particulate filter 28) according to the invention. In step 501, the charge status of the particulate filter may be determined by means of differential pressure sensors (e.g., the differential pressure sensors 40, 42) or by means of a load model.

In step 503, an exhaust temperature and/or a component temperature of an exhaust aftertreatment component, in particular the temperature of the particulate filter or the temperature of a four-way catalyst (e.g., the four-way catalyst 29) may be determined by at least one temperature sensor (e.g., the at least one temperature sensor 38).

In step 505, if regeneration of the particulate filter is required/detected, the particulate filter may be heated to a regeneration temperature (Treg) required for oxidation of the carbon black retained in the particulate filter by generating an additional load by a generator (e.g., the generator 46) of an internal combustion engine (e.g., the internal combustion engine 10) so that an operating point of the internal combustion engine is shifted in the direction of a higher engine torque at the same rotational speed (n1=n2) so that a higher exhaust temperature is established at the same rotational speed (n). In step 505, the exhaust gas is also heated by means of electric heating element(s) (e.g., the electric heating elements 72, 74, 76, 78) of a heated catalyst (e.g., the heated catalyst 26). The electric heating element(s) of the heated catalyst may be supplied with power directly from the generator of the internal combustion engine.

In step 507, during the regeneration of the particulate filter, the internal combustion engine may be operated with a sub-stoichiometric or stoichiometric combustion air ratio, and secondary air may be injected into the exhaust system (e.g., the exhaust system 20) downstream from the last three-way catalyst (e.g., the three-way catalyst 22, 24), such that a super-stoichiometric exhaust gas with an exhaust air ratio of 1.05<λ<1.2 is established at the entrance to the particulate filter.

LIST OF REFERENCE NUMERALS 10 internal combustion engine
12 combustion chamber
14 outlet
16 sparkplug
18 output shaft
20 exhaust system
22 first three-way catalyst
24 second three-way catalyst
26 heated catalyst
28 particulate filter
30 exhaust turbocharger
32 turbine
34 first lambda probe
36 second lambda probe
38 temperature sensor
40 first pressure sensor
42 second pressure sensor
44 battery
46 generator
48 drive element
50 first electric line
52 second electric line
54 third electric line
56 fourth electric line
58 exhaust channel
60 inlet point
61 first heating stage
64 support catalyst
66 second heating stage
68 third heating stage
70 control unit
72 first electric heating element
74 heating disk
76 second electric heating element
78 third electric heating element
$\lambda_E$ combustion air ratio
M torque
n rotational speed
P efficiency
T temperature

The invention claimed is:

1. An exhaust aftertreatment system for an internal combustion engine having an exhaust system having a first three-way catalyst near the engine and a particulate filter arranged downstream from the first three-way catalyst, comprising:
 a heated catalyst having at least one electric heating element arranged downstream from the first three-way catalyst and upstream from the particulate filter, wherein the electric heating element is connected to a generator of the internal combustion engine so that heating of the at least one electric heating element is supplied with electric power directly from the generator; and
 a controller configured to, on detection of a regeneration requirement of the particulate filter;
  cause the generator to generate an additional load to shift an operating point of the internal combustion engine in the direction of a higher engine torque at the same rotational speed (n1=n2) so that a higher exhaust temperature of exhaust gas is established at the same rotational speed (n); and
  cause the heated catalyst to electrically heat the exhaust gas.

2. The exhaust aftertreatment system according to claim 1, wherein the heated catalyst comprises a plurality of electric heating elements.

3. The exhaust aftertreatment system according to claim 2, wherein the heated catalyst further comprises a plurality of heating stages arranged in sequence, wherein a support catalyst is arranged downstream from each heating stage.

4. The exhaust aftertreatment system according to claim 1, wherein the electric heating elements are designed as electric heating disks.

5. The exhaust aftertreatment system according to claim 1, wherein the particulate filter is designed to be free of a catalytic coating.

6. The exhaust aftertreatment system according to claim 1,
 wherein a second three-way catalyst is arranged in the in the exhaust system downstream from the first three-way catalyst and upstream from the heated catalyst, and
 wherein a first lambda probe is arranged in the exhaust system upstream from the first three-way catalyst, and a second lambda probe is arranged downstream from the first three-way catalyst and upstream from the second three-way catalyst.

7. The exhaust aftertreatment system according to claim 6, further comprising an inlet point, for introducing secondary air into the exhaust system, downstream from a second three-way catalyst and upstream from the heated catalyst.

8. The exhaust aftertreatment system according to claim 1, wherein the particulate filter has an underbody installation.

9. A method for exhaust aftertreatment of an internal combustion engine having an exhaust aftertreatment system having a first three-way catalyst near the engine and a particulate filter arranged downstream from the first three-way catalyst, comprising the following steps:
 determining the charge status of the particulate filter,
 determining the component temperature of the particulate filter,
 when regeneration of the particulate filter is required, heating the particulate filter to a regeneration temperature required for oxidation of the carbon black retained in the particulate filter by:
  generating an additional load by a generator of the internal combustion engine to shift an operating point of the internal combustion engine in the direction of a higher engine torque at the same rotational speed (n1=n2) so that a higher exhaust temperature of exhaust gas is established at the same rotational speed (n); and
  electrically heating the exhaust gas via a heated catalyst having at least one electric heating element arranged downstream from the first three-way catalyst and upstream from the particulate filter, wherein the electric heating element of the heated catalyst is supplied with electric power directly from the generator.

10. The method according to claim 9,
 wherein the internal combustion engine is operated with a sub-stoichiometric or stoichiometric combustion air ratio during regeneration of the particulate filter, and
 wherein secondary air is injected into the exhaust system downstream from a second three-way catalyst arranged in the in the exhaust system downstream from the first three-way catalyst and upstream from the heated catalyst, such that a super-stoichiometric exhaust gas with an exhaust air ratio of $1.05<\lambda<1.2$ is established at the entrance to the particulate filter.

\* \* \* \* \*